United States Patent
Ren et al.

(10) Patent No.: US 8,139,462 B1
(45) Date of Patent: Mar. 20, 2012

(54) SYSTEM AND METHOD FOR PRECISE RECORDING

(75) Inventors: Zhiyuan Ren, Malta, NY (US); Xiaolei Shi, Schenectady, NY (US); Victor Petrovich Ostroverkhov, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/953,571

(22) Filed: Nov. 24, 2010

(51) Int. Cl.
*G11B 7/00* (2006.01)
(52) U.S. Cl. .................................................. 369/103
(58) Field of Classification Search .................. 369/103, 369/44.32, 44, 25, 44.26, 44.37, 94; 359/3, 359/10, 11, 22, 31
See application file for complete search history.

(56) References Cited

U.S. PATENT DOCUMENTS

| | | | |
|---|---|---|---|
| 5,982,483 A | | 11/1999 | Lauinger et al. |
| 7,395,968 B2 | | 7/2008 | Dickson et al. |
| 7,453,787 B2 | | 11/2008 | Ogasawara et al. |
| 2008/0316902 A1* | 12/2008 | Saito et al. ............... 369/112.23 |
| 2009/0003155 A1* | 1/2009 | Tanabe .......................... 369/47.5 |
| 2009/0174920 A1* | 7/2009 | Jeong et al. ........................ 359/31 |
| 2009/0310473 A1* | 12/2009 | Katsuura et al. ............ 369/275.4 |
| 2010/0002555 A1* | 1/2010 | Salomon ........................ 369/53.2 |
| 2010/0053710 A1* | 3/2010 | Bae et al. .......................... 359/31 |
| 2010/0165818 A1* | 7/2010 | Ostroverkhov et al. ...... 369/103 |
| 2010/0195453 A1* | 8/2010 | Miyamoto et al. .......... 369/44.11 |

* cited by examiner

*Primary Examiner* — Thang Tran
(74) *Attorney, Agent, or Firm* — Jason K. Klindtworth

(57) ABSTRACT

A method for calculation of recording depth in a holographic disk is disclosed. The method includes applying a first external voltage to one or more actuators coupled to an objective lens to focus a tracking beam of radiation having a first wavelength on a reference layer of the disk, wherein the reference layer comprises at least one of a partially dichroic coating or a partially metallized coating. The method also includes applying a second external voltage to the one or more actuators coupled to the objective lens to focus a recording beam of radiation on the reference layer of the disk, wherein the recording beam comprises a second wavelength different from the first wavelength of the tracking beam. The method further includes computing a difference between the first external voltage and the second external voltage. The method also includes calculating a lens-shift distance based upon the difference using a voltage-distance calibration curve, wherein the lens-shift distance refers to a shift in distance of the objective lens in order to focus the tracking beam of radiation and the recording beam of radiation on the reference layer respectively. The method also calculates the recording depth based upon the lens-shift distance.

20 Claims, 7 Drawing Sheets

SYSTEM AND METHOD FOR PRECISE RECORDING

BACKGROUND

The present techniques relate generally to bit-wise holographic data storage techniques. More specifically, the techniques relate to methods and systems for parallel replication in holographic disks.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disk, developed in the early 1980s, has a capacity of around 650-700 MB of data, or around 74-80 minutes of a two channel audio program. In comparison, the digital versatile disk (DVD) format, developed in the early 1990s, has a capacity of around 4.7 GB (single layer) or 8.5 GB (dual layer). Furthermore, even higher capacity storage techniques have been developed to meet increasing demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. For example, holographic storage systems and micro-holographic storage systems are examples of other developing storage technologies that may achieve increased capacity requirements in the storage industry.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam containing digitally encoded data (e.g., a plurality of bits) is superposed on a reference beam within the volume of the storage medium resulting in a chemical reaction which modulates the refractive index of the medium within the volume. Each bit is therefore generally stored as a part of the interference pattern. In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam.

Bit-wise holographic systems may enable the recording of closer spaced and layer-focused micro-holograms, thus providing much higher storage capacities than prior optical systems. However, currently there does not exist an accurate technique to record holograms at a precise desired depth/layer of the holographic disk. Hence, there is a need for such a recording technique.

BRIEF DESCRIPTION

In accordance with an embodiment of the invention, a method for calculation of recording depth in a holographic disk is provided. The method includes applying a first external voltage to one or more actuators coupled to an objective lens to focus a tracking beam of radiation having a first wavelength on a reference layer of the disk, wherein the reference layer comprises at least one of a partially dichroic coating or a partially metallized coating. The method also includes applying a second external voltage to the one or more actuators coupled to the objective lens to focus a recording beam of radiation on the reference layer of the disk, wherein the recording beam comprises a second wavelength different than the first wavelength of the tracking beam. The method further includes computing a difference between the first external voltage and the second external voltage. The method also includes calculating a lens-shift distance based upon the difference using a voltage-distance calibration curve, wherein the lens-shift distance refers to a shift in distance of the objective lens in order to focus the tracking beam of radiation and the recording beam of radiation respectively. The method further includes calculating the recording depth based upon the lens shift distance.

In accordance with another embodiment of the invention, a system for calculating recording depth in a holographic disk is provided. The system includes a tracking laser source configured to emit a tracking beam of radiation. The system also includes one or more actuators coupled to an objective lens, the objective lens configured to focus the tracking beam of radiation having a first wavelength, on a reference layer of the disk upon application of a first external voltage to the actuators, wherein the reference layer comprises at least one of a partially dichroic coating or a partially metallized coating. The system also includes a recording laser source configured to emit a recording beam of radiation that is focused on the reference layer of the disk via application of a second external voltage to the actuators, the recording beam of radiation comprising a second wavelength different than the first wavelength of the tracking beam of radiation. The system further includes a processing sub-system configured to compute a difference between the first external voltage and the second external voltage. The processing sub-system also calculates the lens-shift distance based upon the difference using a voltage-distance calibration curve, wherein the lens-shift distance refers to a shift in distance of the objective lens in order to focus the tracking beam of radiation and the recording beam of radiation respectively. The processing sub-system further calculates the recording depth based upon the lens shift distance.

In accordance with another embodiment of the invention, a control system for accurately recording data in a holographic disk is provided. The control system includes a tracking laser source that emits a tracking beam of radiation. The control system also includes one or more actuators coupled to an objective lens, wherein the objective lens focuses the tracking beam of radiation on a reference layer of the disk upon application of a first external voltage to the actuators, wherein the reference layer includes at least one of a partially dichroic coating or a partially metallized coating. The control system also includes a recording laser source configured to emit a recording beam of radiation that is focused on the reflective layer of the disk via application of a second external voltage to the actuators, wherein the recording beam of radiation includes a second wavelength different than the first wavelength of the tracking beam of radiation. The control system further includes a processing sub-system that computes a difference between the first external voltage and the second external voltage. The processing sub-system also calculates the lens-shift distance based upon the difference using a voltage-distance calibration curve, wherein the lens-shift distance includes a shift in distance of the objective lens in order to focus the tracking beam of radiation and the recording beam of radiation respectively. The processing sub-system also calculates the recording depth based upon the lens-shift distance. The processing sub-system further compares the current recording depth with a pre-determined recording depth. The processing sub-system also adjusts multiple optical elements in a recording adjustment optical sub-system optically coupled to either the tracking beam or the recording beam, in order to equate the current recording depth with the pre-determined depth.

In accordance with another embodiment of the invention, a method for controlling recording depth in a holographic disk is provided. The method includes applying a first external voltage to one or more actuators coupled to an objective lens to focus a tracking beam of radiation having a first wavelength on a reference layer of the disk, wherein the reference layer includes at least one of a partially dichroic coating or a partially metallized coating. The method also includes applying a second external voltage to the one or more actuators coupled to the objective lens to focus a recording beam of radiation on the reference layer of the disk, wherein the recording beam includes a second wavelength different than the first wavelength of the tracking beam. The method further includes computing a difference between the first external voltage and the second external voltage. The method also includes calculating a lens-shift distance based upon the difference using a voltage-distance calibration curve, wherein the lens-shift distance refers to a shift in distance of the objective lens in order to focus the tracking beam of radiation and the recording beam of radiation respectively. The method also calculates a current recording depth based upon the lens-shift distance. The method further includes comparing the current recording depth with a pre-determined recording depth. The method also includes adjusting multiple optical elements in a recording adjustment optical sub-system optically coupled to either the tracking beam or the recording beam, in order to equate the current recording depth with the pre-determined depth.

DRAWINGS

These and other features, aspects, and advantages of the present invention will become better understood when the following detailed description is read with reference to the accompanying drawings in which like characters represent like parts throughout the drawings, wherein.

Figure 5:
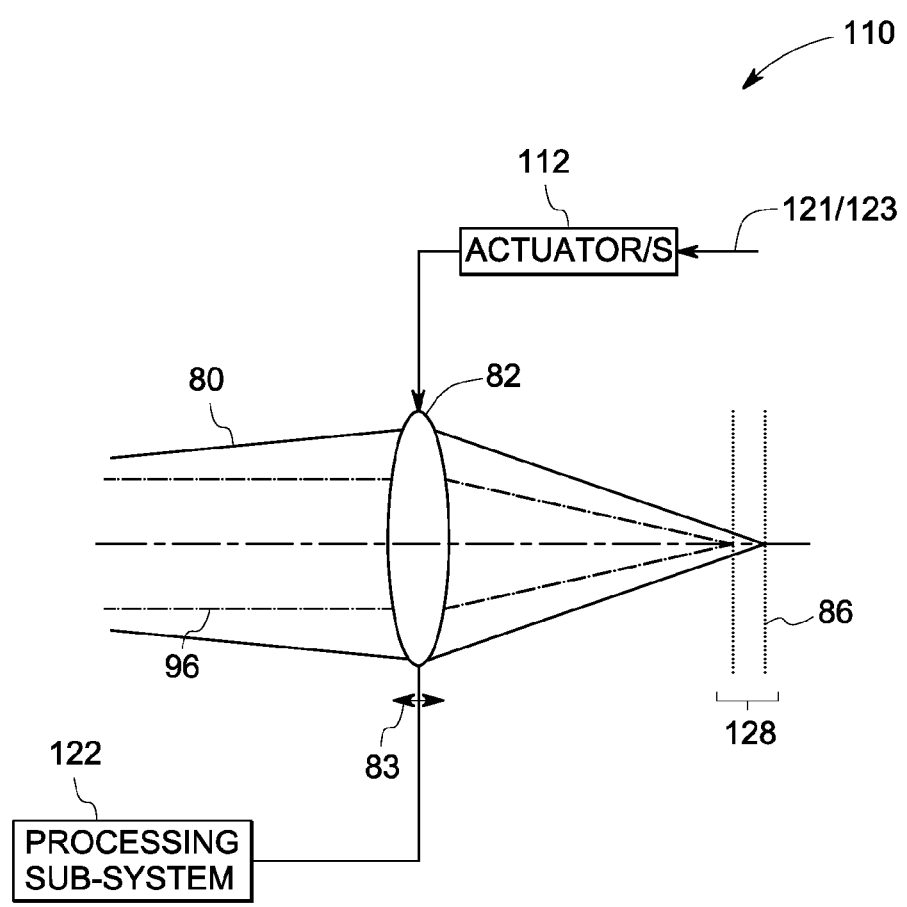
FIG. 5 is a schematic illustration of a recording depth measurement technique based on the recording system in FIG. 4, in accordance with an embodiment of the invention.
Figure 6:
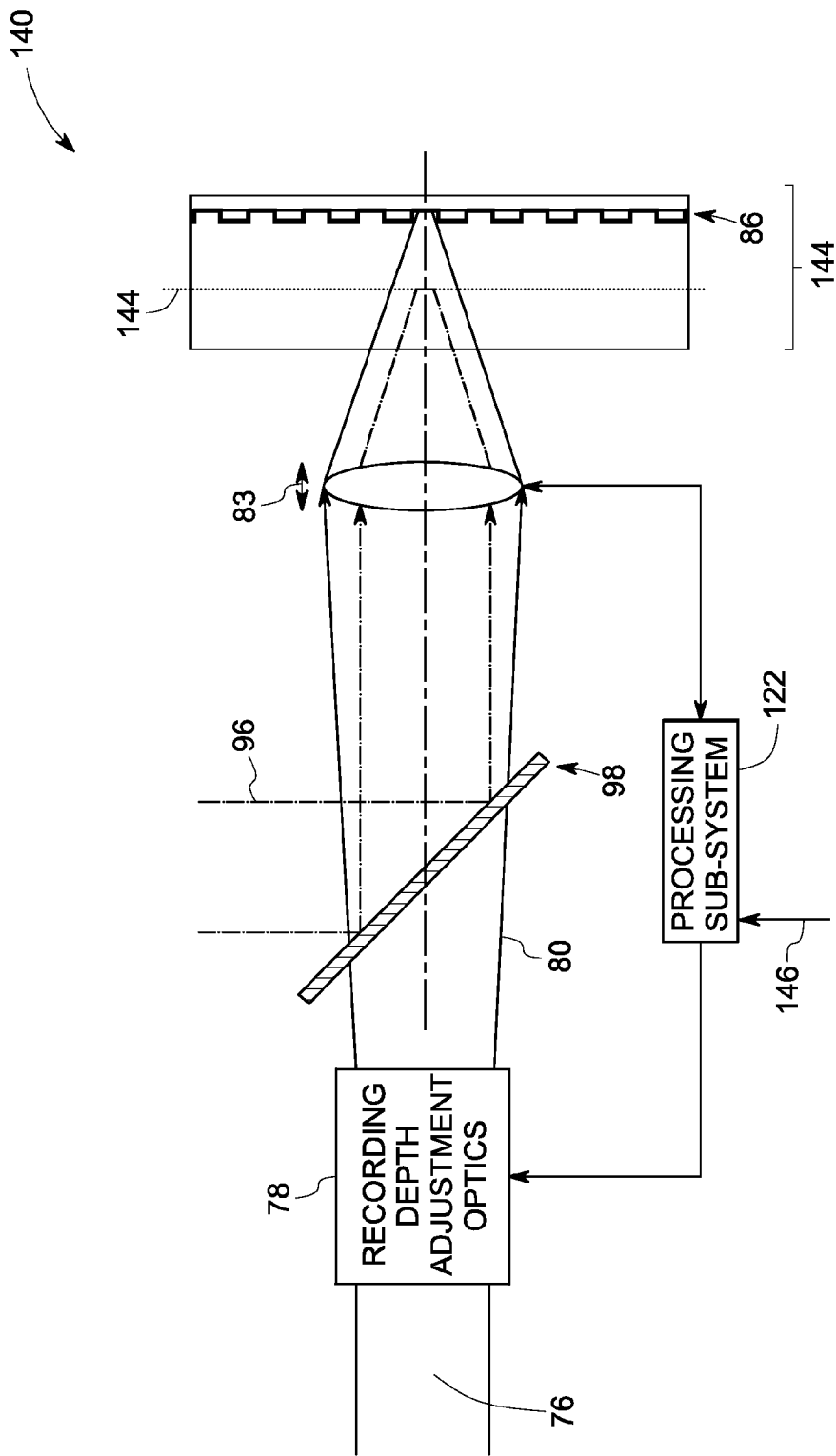

FIG. 6 a schematic illustration of a control system employing the measurement technique in FIG. 5 for accurately recording data in a holographic disk in accordance with an embodiment of the invention.

Figure 7:
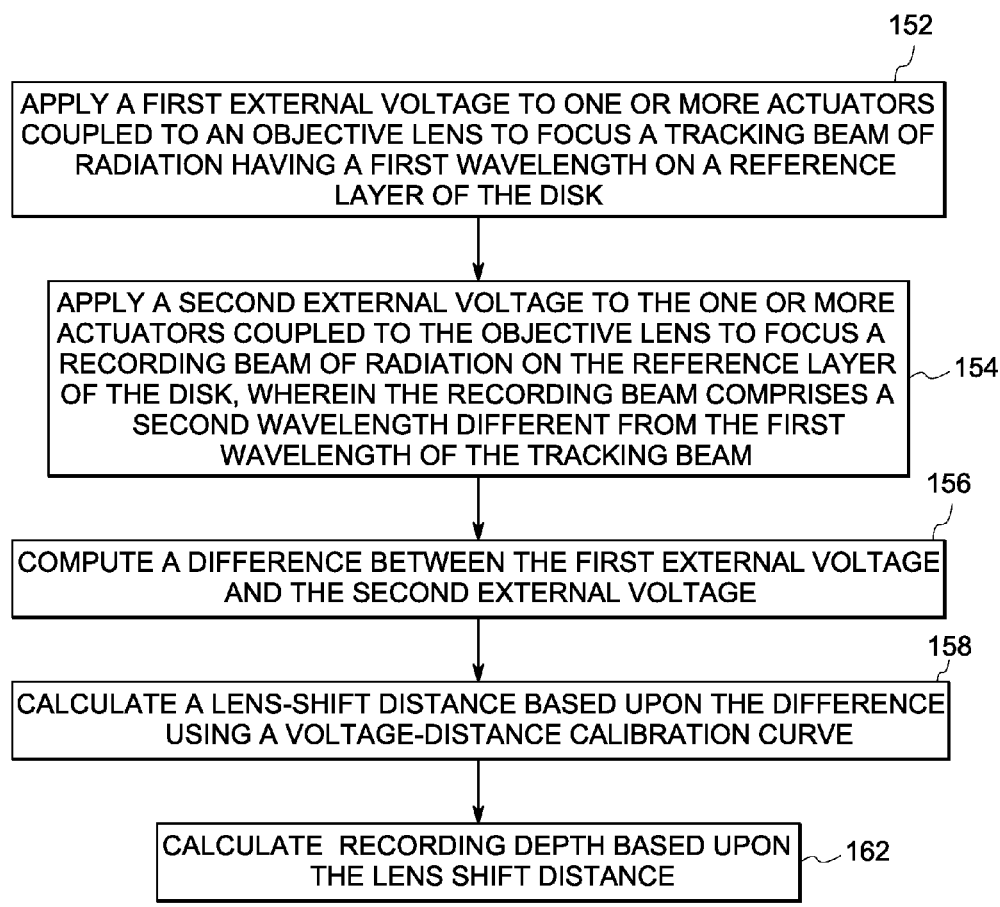

FIG. 7 is a flow chart representing steps in a method for calculation of recording depth in a holographic disk in accordance with an embodiment of the invention.

Figure 8:
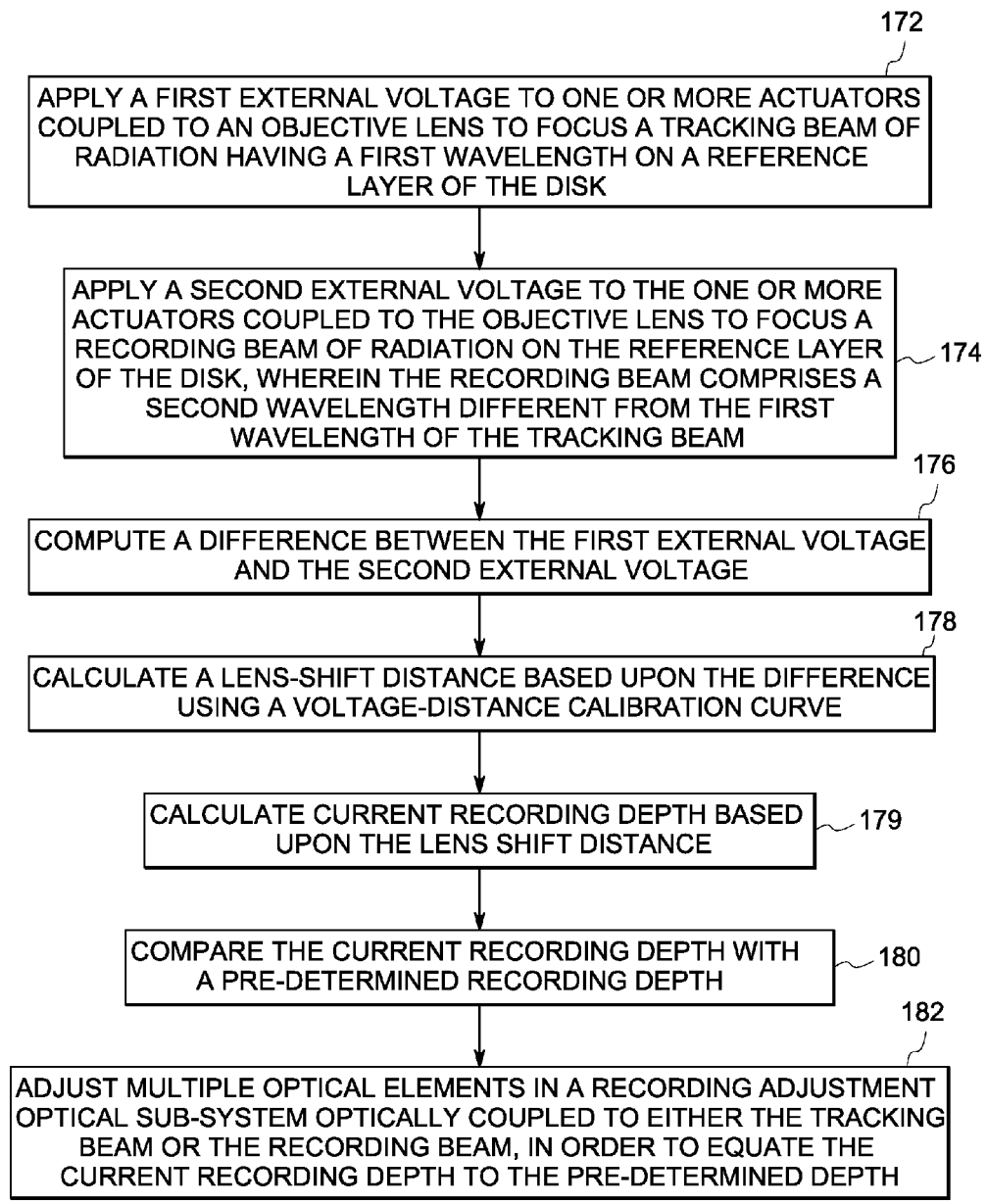

FIG. 8 is a flow chart representing steps in a method for controlling recording depth in a holographic disk in accordance with an embodiment of the invention.

DETAILED DESCRIPTION

As discussed in detail below, embodiments of the invention include a system and method for precise recording. The system and method include a measurement technique, wherein a recording depth of a hologram within the disk may be accurately determined. The system employs a tracking beam and a recording beam of radiation at two different wavelengths and multiple optical elements to achieve precise recording.

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Figure 1:
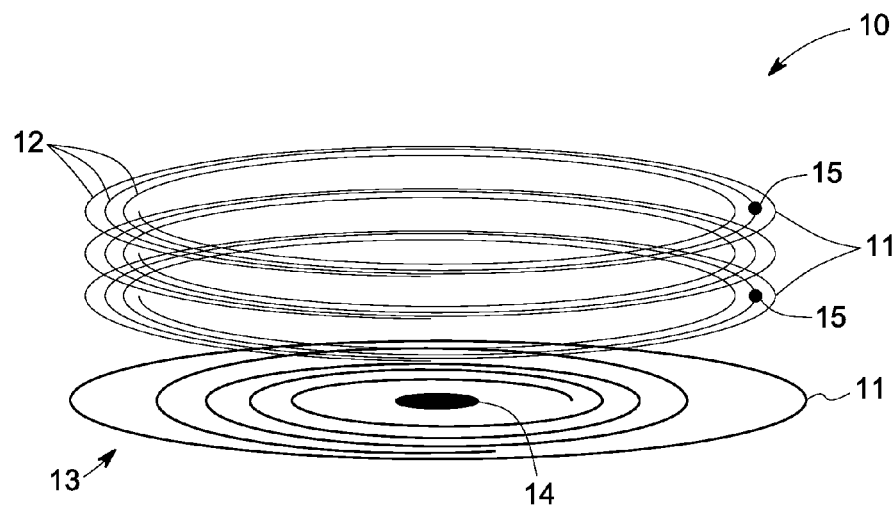
FIG. 1 is a schematic illustration of an exemplary holographic data storage disk in accordance with an embodiment of the invention.

Bit-wise holographic data storage systems typically involve recording by emitting two overlapping and interfering beams inside a recording medium (e.g., a holographic disk). Data bits are represented by the presence or absence of microscopically sized localized holographic patterns, referred to as micro-holograms, which act as volumetric light reflectors when illuminated by a focused beam. For example, the holographic disk 10 illustrated in FIG. 1 represents how data bits may be organized in a layer of the disk 10. Generally, the holographic disk 10 is a round, substantially planar disk with one or more data storage layers 11 embedded in a transparent plastic film. The data layers may include any number of modified regions of the material substantially localized in depth that may reflect light, such as the micro-holograms used for a bit-wise holographic data storage. In some embodiments, the data layers may be embedded in the holographic recordable material, which is responsive to the illumination intensity of light beams impinged on the disk 10. For example, in different embodiments, the disk 10 materials may be threshold responsive or linearly responsive. The data layers may be between approximately 0.05 µm to 5 µm in thickness and may have a separation between approximately 0.5 µm to 250 µm. The reference layer 13 includes a partially dichroic coating or a partially metalized coating or both, and is referenced to in FIGS. 4-6.

Data in the form of micro-holograms 15 may be generally stored in a sequential spiraling track or tracks 12 in the information area from the outer edge of the disk 10 to an inner limit, although concentric circular or spiral tracks, or other configurations, may be used. A spindle hole 14 may be sized to engage about a spindle in a holographic system, such that the disk 10 may be rotated for data recording and/or reading. The rotation of the spindle may be controlled by a feedback system to maintain a constant linear velocity or a constant angular velocity during the recording and/or reading process. Moreover, the disk spindle, the recording optics, and/or the reading optics may be moved by a translation stage or sled in a radial direction of the disk to allow the optical system to record or read across the entire radius of the disk.

Figure 2:
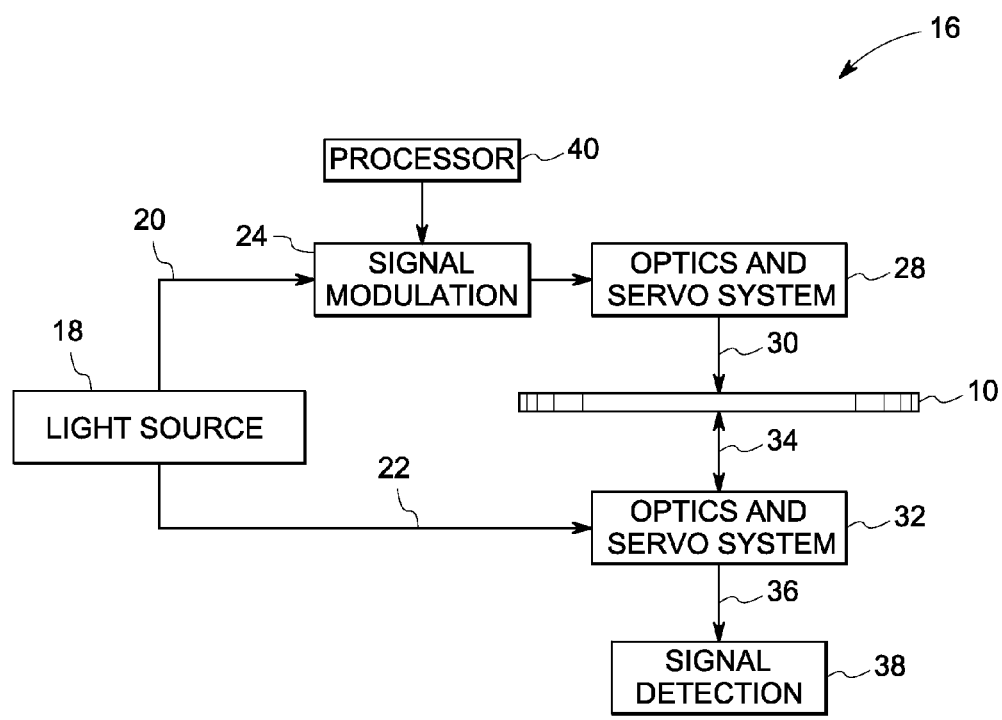
FIG. 2 is a block diagram representation of an exemplary micro-holographic recording system, in accordance with an embodiment of the invention.

A general system of recording micro-holograms to a holographic disk 10 is provided in the block diagram of FIG. 2. The holographic system 16 includes a light source 18 which may be split into a signal beam 20 and a reference beam 22. In some embodiments, the light source 18 (which may be a single light source or multiple single-mode polarized light sources) may emit multiple nearly parallel light beams to be recorded over parallel tracks 12 in a disk 10. The multiple source beams may also be split into multiple signal beams 20 and multiple reference beams 22. The signal beams 20 may be modulated (block 24) according to the data to be recorded on the disk 10. In some embodiments, a processor 40 may control the modulation (block 24) of the signal beams 20. The modulated signal beams 26 may be passed through an optics and servo-mechanic system 28, which may include various optical and servo-mechanic devices configured to focus the focused signal beams 30 on a particular location of the disk 10. For example, the optics and servo-mechanic system 28 may focus the focused signal beams 30 to a particular data layer or data tracks 12 in the disk 10.

The reference beams 22 may also be passed through an optics and servo-mechanic system 32 including various optics and servo-mechanic devices designed to focus the focused reference beams 34 to a particular data layer or data tracks 12 in the disk 10, such that the focused reference beams 34 overlap with the focused signal beams 30. Micro-holograms may be recorded in the holographic disk 10 in illuminated spots of an interference pattern formed by the two overlapping counter-propagating focused laser beams 30 and 34. In some embodiments, recorded micro-holograms may be retrieved from the disk 10 using the focused reference beams 34. Reflections of the focused reference beams 34, referred to as the data reflections 36, may be received at a detector for signal detection 38.

A stream of multiple micro-holograms may be recorded over a track 12 of the disk 10 by maintaining the overlapping counter-propagating focused beams to the desired track while rotating the disk 10 about a spindle positioned through the spindle hole 14. Generally, a certain degree of overlap of the counter-propagating beams is maintained to ensure that micro-holograms are accurately recorded in the appropriate track 12 and/or layer of the holographic disk 10. The optical and servo-mechanic systems 28 and 32 may be utilized to maintain a desired overlap dynamically with disk rotation during a micro-hologram recording process.

Such optical and servo-mechanical components 28 and 32 may add to the complexity of an end-user device for recording a holographic disk 10. The present techniques provide methods and systems for pre-formatting and/or pre-populating a holographic disk 10 with micro-holograms such that the disk 10 may be modified and/or erased by an end-user device using a single beam exposure. Pre-populating a holographic disk may refer to the pre-recording of micro-holograms during a manufacturing process of the holographic disk 10. The micro-holograms recorded during the pre-populating process may represent code, address, tracking data, and/or other auxiliary information. The pre-recorded micro-holograms may be subsequently modified and/or erased using a single beam rather than overlapping counter-propagating beams. Thus, an end-user system need not maintain overlapping counter-propagating laser beams to record data to a pre-populated holographic disk. Instead, an end-user system using a single-sided beam or beams may be used to record data by modifying and/or erasing micro-holograms on the pre-populated holographic disk.

While recording micro-holograms with counter-propagating beams to pre-populate a holographic disk may decrease the complexity of micro-hologram modification for an end user device, the process of pre-populating the disk may also be improved in accordance with the present techniques. As discussed, when pre-populating the holographic disk 10, the disk 10 is rotated in the holographic system such that the overlapping counter-propagating beams directed to the disk 10 may record micro-holograms over a selected track 12 and/or layer of the disk 10. The rotation speed of the disk 10, which is limited in part by the mechanical strength of the disk material, limits the speed (referred to as the transfer rate) at which micro-holograms can be recorded. For example, a typical disk rotation speed of a Blu-ray Disc™ may result in a transfer rate in a single-channel system of approximately 430 Mbits/second at 12×BD rate. At this transfer rate, the recording time per data layer in the disk is approximately 500 seconds.

In one or more embodiments, parallel micro-hologram recording techniques may be used to increase the transfer rate and reduce the recording time for a holographic disk 10. For example, parallel micro-hologram recording may involve directing multiple beams to a holographic disk to illuminate more than one track 12 in the disk 10. A beam may refer to a collection of light propagating in substantially the same direction through the same set of optical elements, and may include light originated from different light sources. Multiple beams may also be directed to more than one track 12 of the disk 10 from an opposite direction (i.e., counter-propagating beams) such that multiple overlapping counter-propagating beams may create an interference pattern of multiple illumination spots which result in multiple recorded micro-holograms in parallel tracks 12 of the disk 10. Furthermore, in some embodiments, the overlapping beams may interfere at a focused spot having a relatively small area with respect to the data layer plane. The focused illumination spots of the interference pattern may be separated by non-illuminated regions. By limiting the illuminated areas on a data layer, the depth spread of recorded micro-holograms may be limited to a desired size and/or limited on a desired data layer (e.g., between approximately 0.05 μm to 5 μm).

Figure 3:
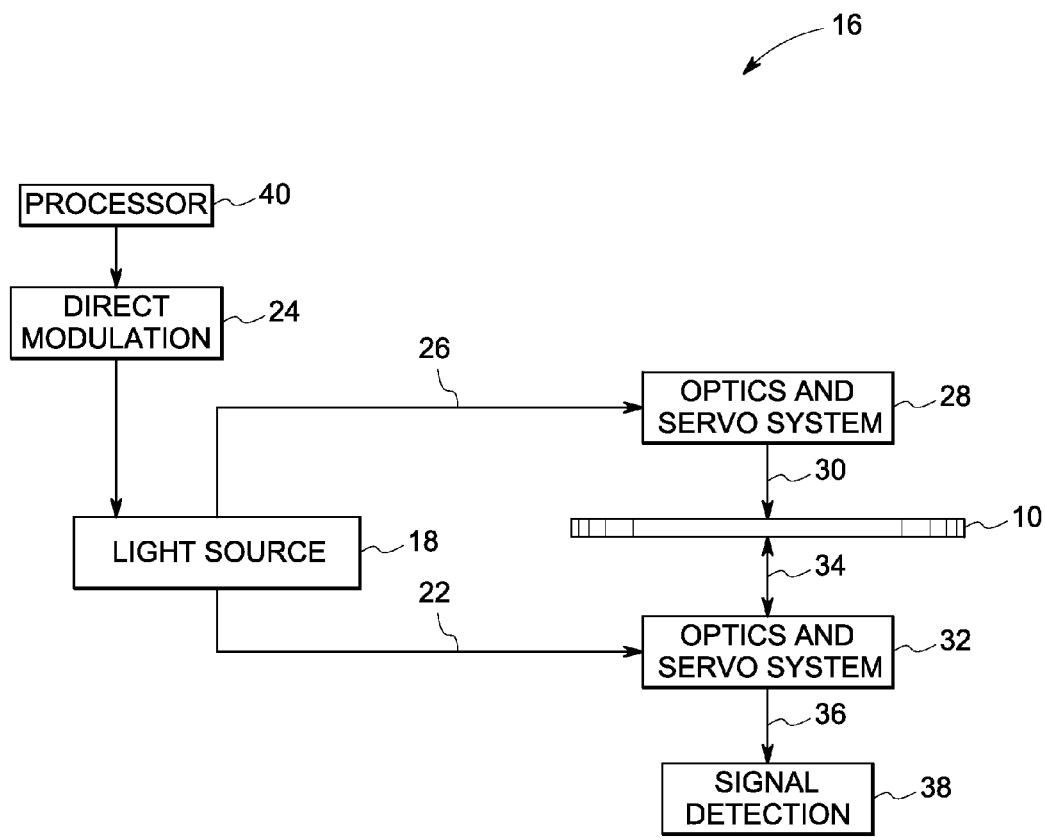
FIG. 3 is a block diagram representation of another exemplary micro-holographic recording system, in accordance with an embodiment of the invention.

Furthermore, as provided in FIG. 3, one or more embodiments of replication systems involve the direct modulation of the parallel channel light source 18. For example, the parallel channel light source 18 may be coupled to a modulator 24 suitable for directly modulating the parallel channel light source 18. The modulator 24 may be controlled by a processor 40 and may modulate the parallel channel light source 18 such that the modulated signal beams 26 emitted by the parallel channel light source 18 include the information to be recorded on the replica disk 10.

Figure 4:
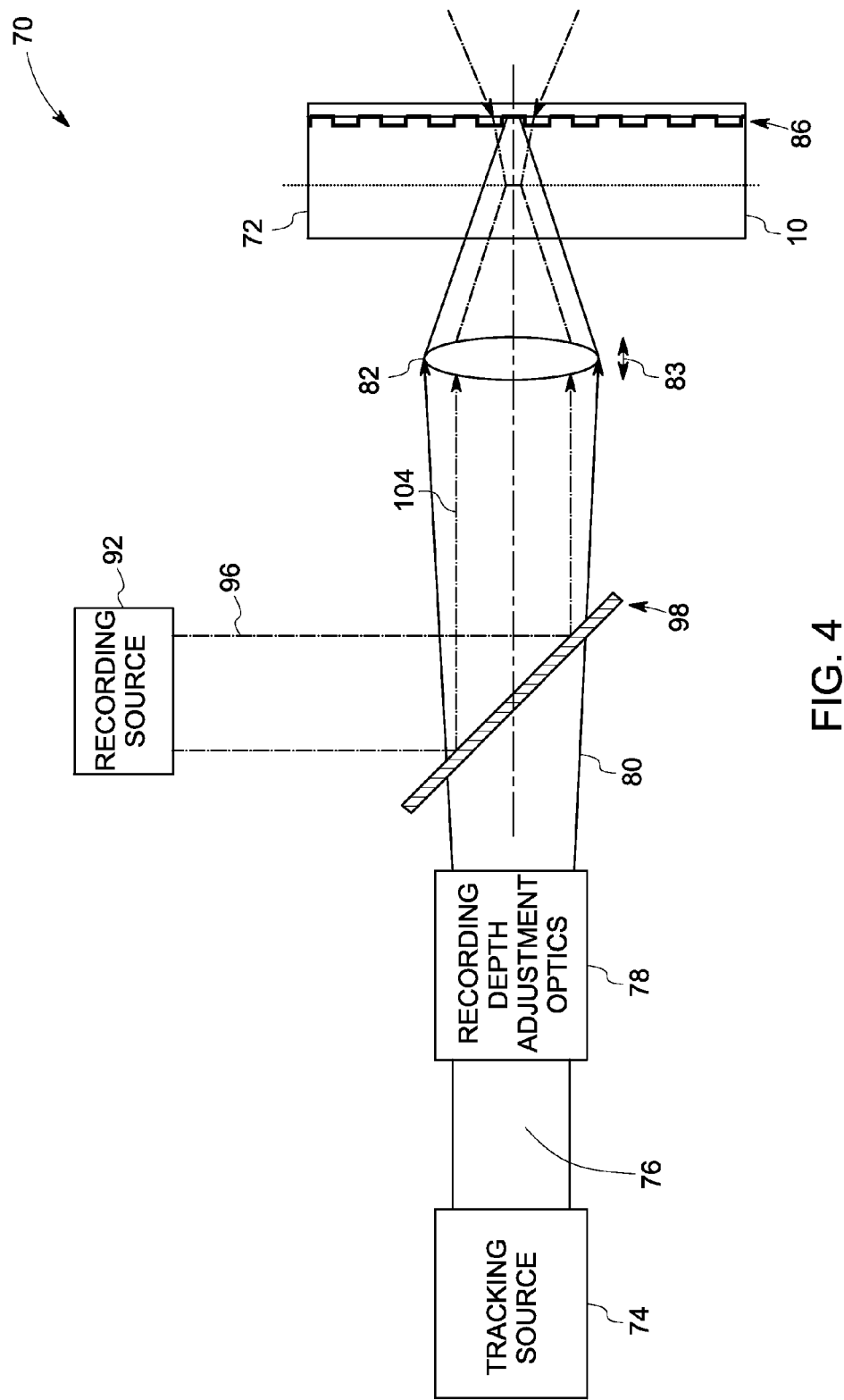
FIG. 4 is a schematic illustration of a two wavelength recording system in a holographic disk in accordance with an embodiment of the invention.

FIG. 4 is a schematic illustration of a two wavelength recording system 70 in a holographic disk 10 (FIG. 1) in accordance with an embodiment of the invention. A tracking laser source 74 emits a tracking beam 76 of radiation having a first wavelength. In a particular embodiment, the first wavelength includes a range between about 400 nm to about 800 nm. The tracking beam 76 is incident upon an optical sub-system 78, referred to as a recording depth adjustment optical sub-system.

In one embodiment, the recording depth adjustment optical sub-system includes multiple lenses. The adjusted tracking beam 80 is incident upon an objective lens 82 that translates along a beam propagation direction 83 to focus the beam 80 upon a reference layer 86 of the disk 10. In one embodiment, the reference layer includes at least one of a partially dichroic coating or a partially metallized coating. Non-limiting examples of dichroic coating includes mutliple dielectric layers of oxides and nitrides. In another embodiment, the metallized coating includes one of aluminum or gold or silver or their mixed alloys. In another embodiment, the reference layer reflects about 100% of the tracking beam of radiation, and reflects up to about 1% of the recording beam of radiation. Similarly, a recording laser source 92 having a second wavelength different from the first wavelength, emits a recording beam 96 of radiation that is further incident upon an optical element such as, but not limited to, a dichroic mirror 98 disposed at a certain angle with respect to optical axis 102. In a particular embodiment, the second wavelength includes a range between about 375 nm to about 650 nm. The dichroic mirror 98 reflects the incident recording beam 96 resulting in a reflected recording beam 104. The objective lens 82 focuses the reflected recording beam 104 to ensure the beam 104 is incident at a desired recording depth 72 in the disk 10.

FIG. 5 is a schematic illustration of a recording depth measurement system 110 based on the recording system 70 in FIG. 4. One or more actuators 112 are coupled to the objective lens 82 (FIG. 4). A first external voltage is applied to the actuators 112 that trigger translatory motion of the objective lens 82 along a beam propagation direction 83 to allow focusing of the tracking beam 80 (FIG. 4) on the reference layer 86 of the disk 10. Such first external voltage 121 that enables focusing of the tracking beam is recorded by a processing sub-system 122. Similarly, a second external voltage 123 is applied to the actuators 112 that trigger movement of the objective lens 82 to allow focusing of the recording beam 96 (FIG. 4) on the reference layer 86 of the disk 10. Such second external voltage that enables focusing of the recording beam 96 is again recorded by the processing sub-system 122. The processing sub-system 122 further computes a difference between the first external voltage and the second external voltage, and calculates a lens-shift distance based upon the difference using a voltage-distance calibration curve. As used herein, 'lens-shift distance' refers to a shift in distance of the objective lens 82 in order to focus the tracking beam 80 of radiation and the recording beam 96 respectively on the reference layer 86 of the disk 10. The processing sub-system then calculates recording depth 128 based upon the lens-shift distance.

FIG. 6 is a schematic illustration of a control system 140 for accurately recording data at a specific depth 144 in a holographic disk 10 (FIG. 1). The control system 140 includes the processing sub-system 122 (FIG. 5) that serves as a feedback control system to the recording system of FIGS. 4 and 5. Upon calculation of the recording depth, as discussed above in FIG. 5, the processing sub-system compares the current recording depth 144 with a pre-determined recording depth 146. In an event that the desired recording depth has not been achieved, multiple optical elements in the recording depth adjustment optical sub-system 78 are adjusted along the beam propagation direction 83, in order to equate the current recording depth with the pre-determined depth.

FIG. 7 is a flow chart representing steps in a method for calculation of recording depth in a holographic disk. The method includes applying a first external voltage to one or more actuators coupled to an objective lens to focus a tracking beam of radiation having a first wavelength on a reference layer of the disk in step 152, wherein the reference layer includes at least one of a partially dichroic coating or a partially metallized coating. A second external voltage is applied in step 154 to the one or more actuators coupled to the objective lens to focus a recording beam of radiation on the reference layer of the disk, wherein the recording beam has a second wavelength different than the first wavelength of the tracking beam. Furthermore, a difference between the first external voltage and the second external voltage is computed in step 156. A lens-shift distance is calculated based upon the difference using a voltage-distance calibration curve in step 158 wherein the lens-shift distance is defined as a shift in distance of the objective lens in order to focus the tracking beam of radiation and the recording beam of radiation respectively. In a particular embodiment, the voltage-distance calibration curve is obtained via a stage micrometer. Furthermore, the recording depth is calculated based upon the lens-shift distance in step 162. In a particular embodiment, the recording depth is calculated by factoring in a refractive index of material used in the holographic disk.

FIG. 8 is a flow chart representing steps in a method for controlling recording depth in a holographic disk. The method includes applying a first external voltage in step 172 to one or more actuators coupled to an objective lens to focus a tracking beam of radiation having a first wavelength on a reference layer of the disk, wherein the reference layer comprises at least one of a partially dichroic coating or a partially metallized coating. A second external voltage is applied in step 174 to the one or more actuators coupled to the objective lens to focus a recording beam of radiation on the reference layer of the disk, wherein the recording beam comprises a second wavelength different than the first wavelength of the tracking beam. A difference between the first external voltage and the second external voltage is computed in step 176. A lens-shift distance is calculated in step 178 based upon the difference using a voltage-distance calibration curve, wherein the lens-shift distance refers to a shift in distance of the objective lens in order to focus the tracking beam of radiation and the recording beam of radiation respectively. A current recording depth is calculated based upon the lens-shift distance in step 179. The current recording depth is compared with a pre-determined recording depth in step 180. Multiple optical elements are adjusted in step 182 in a recording adjustment optical sub-system optically coupled to either the tracking beam or the recording beam, in order to equate the current recording depth with the pre-determined depth.

The various embodiments of a system and method for precise recording in a holographic disk described above thus provide a way to achieve a convenient and efficient means of identifying the depth/layer of the disk wherein data is to be recorded. This technique also provides for precisely recording data at desirable depth/layer even when the disk is not rotating. The technique also employs existing holographic recording systems resulting in a cost-effective means for accurate recording.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. Similarly, the various features described, as well as other known equivalents for each feature, can be mixed and matched by one of ordinary skill in this art to construct additional systems and techniques in accordance with principles of this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for calculation of recording depth in a holographic disk, the method comprising:
    applying a first external voltage to one or more actuators coupled to an objective lens to focus a tracking beam of radiation having a first wavelength on a reference layer of the disk, wherein the reference layer comprises at least one of a partially dichroic coating or a partially metallized coating;
    applying a second external voltage to the one or more actuators coupled to the objective lens to focus a recording beam of radiation on the reference layer of the disk, wherein the recording beam comprises a second wavelength different from the first wavelength of the tracking beam;
    computing a difference between the first external voltage and the second external voltage;
    calculating a lens-shift distance based upon the difference using a voltage-distance calibration curve, wherein the lens-shift distance comprises shift in distance of the objective lens in order to focus the tracking beam of radiation and the recording beam of radiation on the reference layer respectively; and
    calculating the recording depth based upon the lens shift distance.

2. The method of claim 1, wherein said voltage-distance calibration curve is obtained via a stage micrometer.

3. The method of claim 1, wherein said calculating the recording depth comprises factoring in a refractive index of material used in the holographic disk.

4. A system for calculating recording depth in a holographic disk, the system comprising:
    a tracking laser source configured to emit a tracking beam of radiation having a first wavelength;
    one or more actuators coupled to an objective lens, the objective lens configured to focus the tracking beam of radiation having a first wavelength on a reference layer of the disk upon application of a first external voltage to the actuators, wherein the reference layer comprises at least one of a partially dichroic coating or a partially metallized coating; and
    a recording laser source configured to emit a recording beam of radiation that is focused on the reference layer of the disk via application of a second external voltage to the actuators, the recording beam of radiation comprising a second wavelength different from the first wavelength of the tracking beam of radiation;
    a processing sub-system configured to:
        compute a difference between the first external voltage and the second external voltage;
        calculate a lens-shift distance based upon the difference using a voltage-distance calibration curve, wherein the lens-shift distance comprises shift in distance of the objective lens in order to focus the tracking beam of radiation and the recording beam of radiation on the reference layer respectively; and
        calculate the recording depth based upon the lens shift distance.

5. The system of claim 4, further comprising a recording depth adjustment optical sub-system configured to adjust the recording depth in the disk.

6. The system of claim 5, wherein said recording depth adjustment optical sub-system comprise a plurality of lenses.

7. The system of claim 5, wherein said recording adjustment optical sub-system is coupled to either the optical path of the tracking beam or the optical path of the recording beam.

8. The system of claim 4, wherein said dichroic coating comprises mutliple dielectric layers of oxides and nitrides.

9. The system of claim 4, wherein said metallized coating comprises one of aluminum or gold or silver or their mixed alloys.

10. The system of claim 4, wherein said first wavelength of tracking laser source comprises a wavelength in the range between about 400 nm to about 800 nm.

11. The system of claim 4, wherein said wavelength of recording laser source comprises a wavelength in the range between about 375 nm to about 650 nm.

12. The system of claim 4, wherein the reference layer reflects up to about 100% of the tracking beam of radiation, and reflects up to about 1% of the recording beam of radiation.

13. A control system for accurately recording data at a specific depth in a holographic disk comprising:
    a tracking laser source configured to emit a tracking beam of radiation;
    one or more actuators coupled to an objective lens, the objective lens configured to focus the tracking beam of radiation on a reference layer of the disk upon application of a first external voltage to the actuators, wherein the reference layer comprises at least one of a partially dichroic coating or a partially metallized coating;
    a recording laser source configured to emit a recording beam of radiation that is focused on the reflective layer of the disk via application of a second external voltage to the actuators, the recording beam of radiation comprising a second wavelength different from the wavelength of the tracking beam of radiation;
    a recording adjustment optical sub-system comprising a plurality of optical elements, the recording adjustment optical sub-system configured to change the recording depth of the recording beam of radiation; and
    a processing sub-system configured to:
        compute a difference between the first external voltage and the second external voltage;
        calculate a lens-shift distance based upon the difference using a voltage-distance calibration curve, wherein the lens-shift distance comprises shift in distance of the objective lens in order to focus the tracking beam of radiation and the recording beam of radiation respectively;
        calculate the recording depth based upon the lens shift distance;
        compare the recording depth with a pre-determined recording depth; and
        adjust the plurality of optical elements in the recording adjustment optical sub-system to equate the current recording depth to the pre-determined depth.

14. The system of claim 13, wherein said adjusting the plurality of optical elements in the recording adjustment optical sub-system comprises translating one or more of the plurality of lenses along the beam propagation direction.

15. The system of claim 13, wherein said dichroic coating comprises mutliple dielectric layers of oxides and nitrides.

16. The system of claim 13, wherein said metallized coating comprises one of aluminum or gold or silver or their mixed alloys.

17. The system of claim 13, wherein said first wavelength of tracking laser source comprises a wavelength in the range between about 400 nm to about 800 nm.

18. The system of claim 13, wherein said second wavelength of recording laser source comprises a wavelength in the range between about 375 nm to about 650 nm.

19. The system of claim 13, wherein the reference layer reflects up to about 100% of the tracking beam of radiation, and reflects up to about 1% of the recording beam of radiation.

20. A method for controlling recording depth in a holographic disk comprising:
   applying a first external voltage to one or more actuators coupled to an objective lens to focus a tracking beam of radiation having a first wavelength on a reference layer of the disk, wherein the reference layer comprises at least one of a partially dichroic coating or a partially metallized coating;
   applying a second external voltage to the one or more actuators coupled to the objective lens to focus a recording beam of radiation on the reference layer of the disk, wherein the recording beam comprises a second wavelength different than the first wavelength of the tracking beam;
   computing a difference between the first external voltage and the second external voltage;
   calculating a lens-shift distance based upon the difference using a voltage-distance calibration curve, wherein the lens-shift distance comprises shift in distance of the objective lens in order to focus the tracking beam of radiation and the recording beam of radiation respectively;
   calculating the recording depth based upon the lens shift distance;
   comparing the current recording depth with a pre-determined recording depth; and
   adjusting a plurality of optical elements in a recording adjustment optical sub-system to equate the current recording depth with the pre-determined depth.

* * * * *

UNITED STATES PATENT AND TRADEMARK OFFICE
CERTIFICATE OF CORRECTION

| | | |
|---|---|---|
| PATENT NO. | : 8,139,462 B1 | Page 1 of 1 |
| APPLICATION NO. | : 12/953571 | |
| DATED | : March 20, 2012 | |
| INVENTOR(S) | : Ren et al. | |

It is certified that error appears in the above-identified patent and that said Letters Patent is hereby corrected as shown below:

In Column 3, Line 61, delete "a" and insert -- is a --, therefor.

In Column 6, Line 66, delete "mutliple" and insert -- multiple --, therefor.

In Column 10, Line 10, in Claim 8, delete "mutliple" and insert -- multiple --, therefor.

In Column 10, Line 64, in Claim 15, delete "mutliple" and insert -- multiple --, therefor.

Signed and Sealed this
Fifteenth Day of May, 2012

David J. Kappos
*Director of the United States Patent and Trademark Office*